US009049322B2

(12) United States Patent
Saotome

(10) Patent No.: US 9,049,322 B2
(45) Date of Patent: Jun. 2, 2015

(54) INFORMATION PROCESSING APPARATUS, CONTROL METHOD, AND INFORMATION PROCESSING SYSTEM FOR PERFORMING WIRELESS COMMUNICATION

(71) Applicant: CANON KABUSHIKI KAISHA, Tokyo (JP)

(72) Inventor: Yutaka Saotome, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/212,445

(22) Filed: Mar. 14, 2014

(65) Prior Publication Data
US 2014/0268203 A1 Sep. 18, 2014

(30) Foreign Application Priority Data
Mar. 15, 2013 (JP) ................. 2013-053601

(51) Int. Cl.
G06F 3/12 (2006.01)
H04N 1/00 (2006.01)
(52) U.S. Cl.
CPC ....... H04N 1/00408 (2013.01); H04N 1/00342 (2013.01); H04N 1/00517 (2013.01)

(58) Field of Classification Search
None
See application file for complete search history.

(56) References Cited

U.S. PATENT DOCUMENTS

| | | | | |
|---|---|---|---|---|
| 7,970,350 B2 * | 6/2011 | Sheynman et al. | .......... | 455/41.1 |
| 2002/0113987 A1 * | 8/2002 | Kohli | ............ | 358/1.13 |
| 2002/0159090 A1 * | 10/2002 | Nobutani et al. | ............ | 358/1.15 |
| 2006/0114499 A1 * | 6/2006 | Sumita et al. | ............ | 358/1.15 |
| 2009/0066998 A1 * | 3/2009 | Kato | ............ | 358/1.15 |

FOREIGN PATENT DOCUMENTS

| | | |
|---|---|---|
| JP | 4-182675 A | 6/1992 |
| JP | 2005-339108 A | 12/2005 |
| JP | 2006-113190 A | 4/2006 |
| JP | 2009-284213 A | 12/2009 |
| JP | 4776943 B2 | 9/2011 |
| WO | 2007-034457 A1 | 3/2007 |

* cited by examiner

Primary Examiner — Jeremiah Bryar
(74) Attorney, Agent, or Firm — Canon U.S.A. Inc., IP Division

(57) ABSTRACT

In response to detecting a wireless communication apparatus, an information processing apparatus acquires from the wireless communication apparatus setting information for causing a function corresponding to a display screen to be executed, and executes the function based on the acquired setting information.

17 Claims, 16 Drawing Sheets

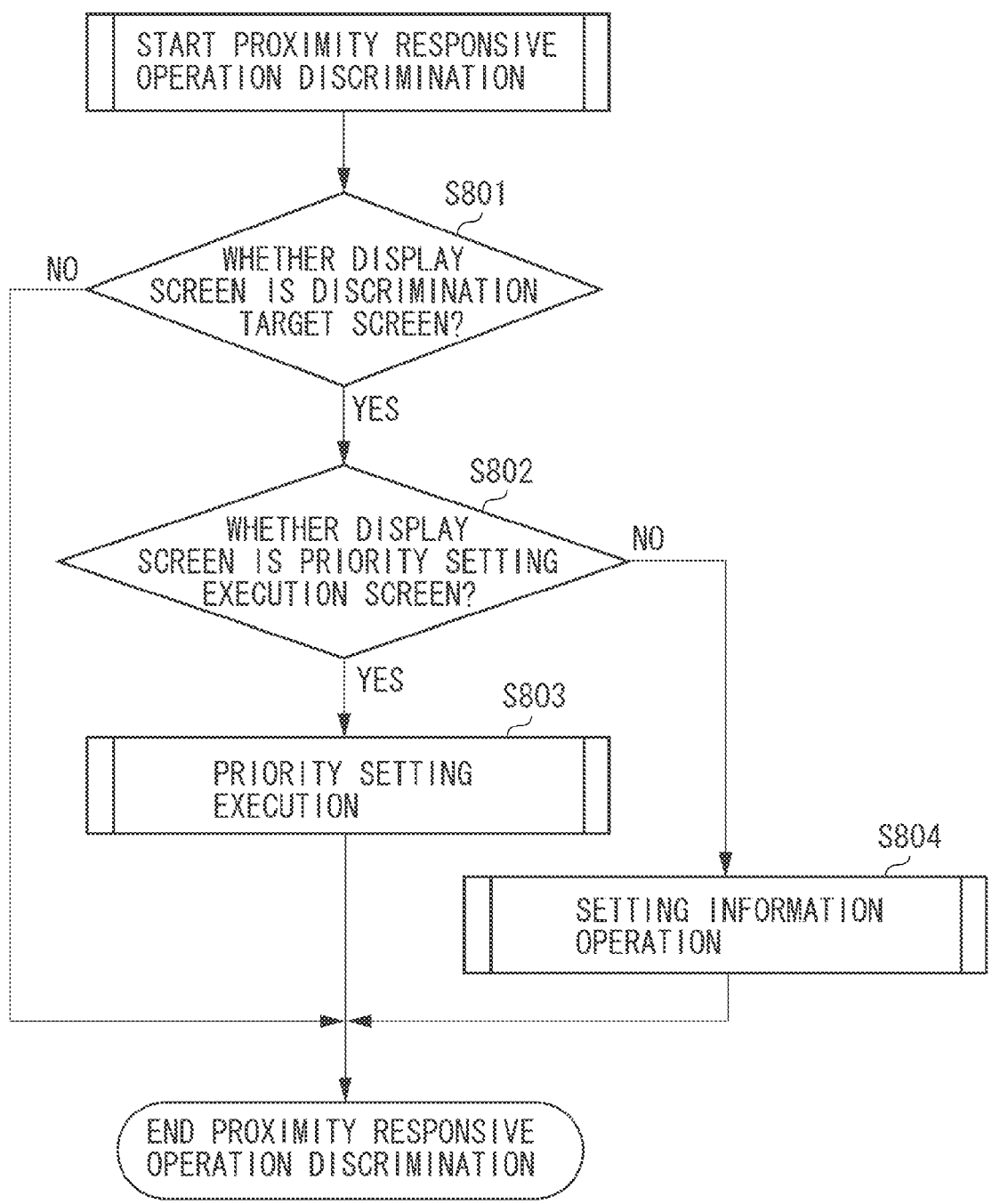

FIG. 9A

| SCREEN ID | PROXIMITY RESPONSIVE OPERATION ID | FUNCTION ID | DISPLAY SCREEN |
|---|---|---|---|
| 1 | 1 | 1 | COPY/PRIORITY SETTING EXECUTION SCREEN |
| 2 | 1 | 2 | FAX/PRIORITY SETTING EXECUTION SCREEN |
| 3 | 1 | 3 | SCAN/PRIORITY SETTING EXECUTION SCREEN |
| 4 | 2 | 1 | COPY/SETTING INFORMATION OPERATION SCREEN |
| 5 | 2 | 2 | FAX/SETTING INFORMATION OPERATION SCREEN |
| 6 | 2 | 3 | SCAN/SETTING INFORMATION OPERATION SCREEN |
| 99 | 99 | 99 | OTHER SCREENS |

FIG. 9B

| PROXIMITY RESPONSIVE OPERATION | PROXIMITY RESPONSIVE OPERATION ID |
|---|---|
| PRIORITY SETTING EXECUTION | 1 |
| SETTING INFORMATION OPERATION | 2 |
| NOT APPLICABLE | 99 |

FIG. 9C

| FUNCTION | FUNCTION ID |
|---|---|
| COPY | 1 |
| FAX | 2 |
| SCAN | 3 |
| NOT APPLICABLE | 99 |

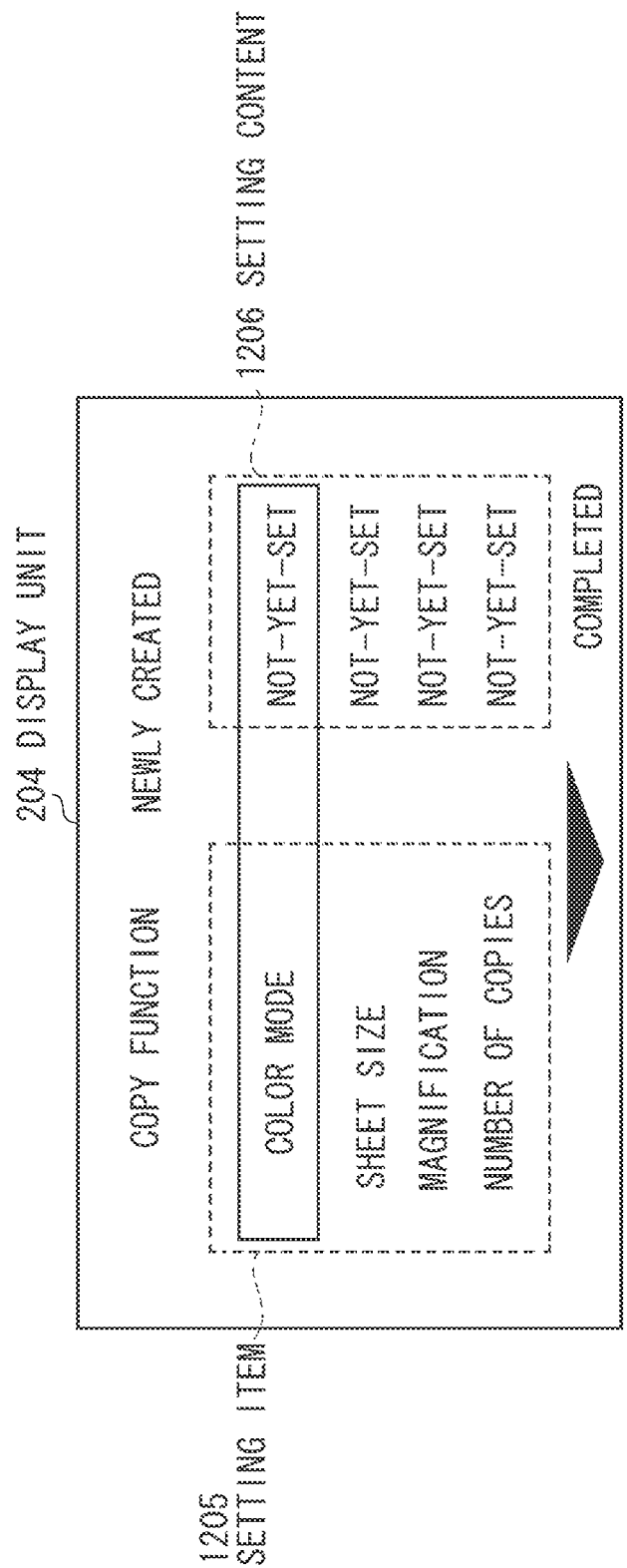

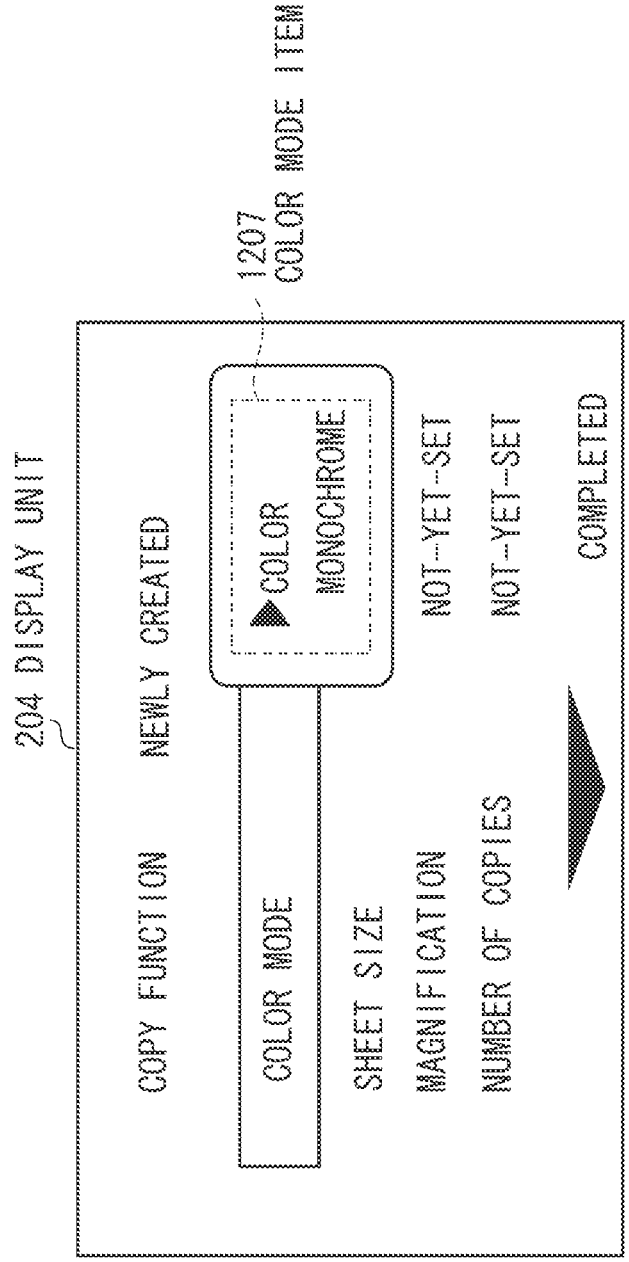

INFORMATION PROCESSING APPARATUS, CONTROL METHOD, AND INFORMATION PROCESSING SYSTEM FOR PERFORMING WIRELESS COMMUNICATION

BACKGROUND

1. Field

Aspects of the present invention generally relate to an information processing apparatus equipped with a function of performing transmission and reception of information, through a short-distance wireless communication.

2. Description of the Related Art

In recent years, the widespread use of multifunction apparatuses including multifunction printers (MFPs) has been progressing. When using such a multifunction apparatus, a user first selects a function to be executed, sets how to execute the selected function, and thereafter starts the function. At that time, the user may have to perform input operations using a user interface (UI) several times for selection and setting of a function of an information processing apparatus. Further, there is a possibility that the information processing apparatus switches between a plurality of screens several times during reception of the inputs from the user. As a result, the input operations for executing the processing based on settings which the user wants to realize becomes often troublesome.

Japanese Patent No. 4776943 discusses a technique for changing data to be transmitted depending on a number of times that a non-contact integrated circuit (IC) card carried by a user has been moved closer to a non-contact IC card reader/writer of an information processing apparatus within a predetermined time period.

Further, PCT International Publication No. WO 2007-034457 discusses a technique for, in a case where a mobile terminal is touched to a digital photo frame, making functions (reproduction, volume change, or the like) different depending on the length of time during which the mobile terminal is kept touching.

However, as in Japanese Patent No. 4776943 or PCT International Publication No. WO 2007-034457, if switching of functions of the information processing apparatus is performed depending on a length of time or a number of times a mobile terminal, for example, has been moved closer to the information processing apparatus, association between a number of times or a length of time the mobile terminal has been brought into proximity and function is difficult for the user to know and it is difficult to intuitively operate.

SUMMARY

According to an aspect of the present disclosure, an information processing apparatus includes a detection unit configured to detect a wireless communication apparatus, an acquisition unit configured to acquire from the wireless communication apparatus, setting information for causing a function corresponding to a state of the information processing apparatus to be executed, in response to detection by the detection unit, and an execution unit configured to execute the function corresponding to the state of the information processing apparatus based on the setting information acquired by the acquisition unit.

Further features of the present disclosure will become apparent from the following description of exemplary embodiments with reference to the attached drawings.

BRIEF DESCRIPTION OF THE DRAWINGS

FIG. 8 is a flowchart schematically illustrating processing of the MFP.

FIGS. 9A, 9B, and 9C are tables held by a read only memory (ROM).

FIGS. 12A, 12B, and 12C illustrate examples of display screens of the MFP.

DESCRIPTION OF THE EMBODIMENTS

Various exemplary embodiments, features, and aspects are described in detail below with reference to the drawings.

Figure 1:
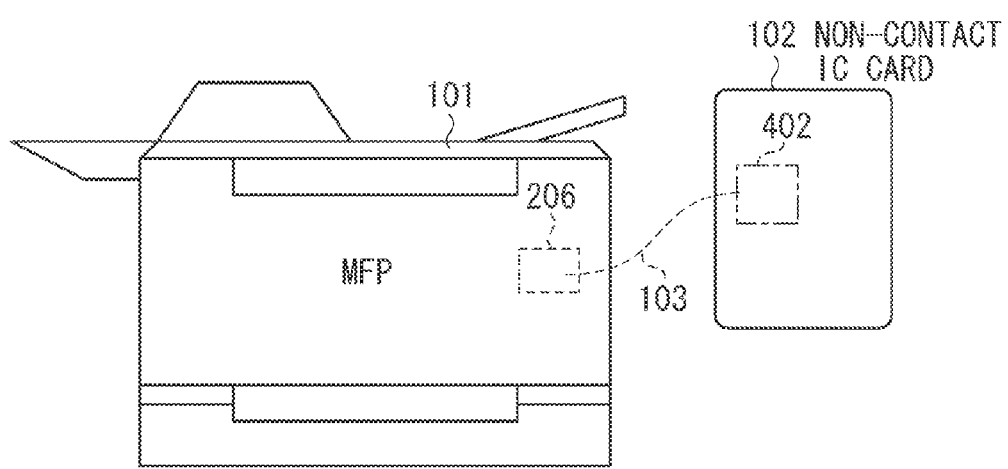
FIG. 1 is a schematic diagram schematically illustrating a form of an information processing system.

The outline of an entire information processing system according to an exemplary embodiment is illustrated in FIG. 1. The information processing system according to the present exemplary embodiment includes an MFP 101 as an information processing apparatus equipped with a wireless communication function, and a non-contact IC card 102 as a wireless communication apparatus equipped with a wireless communication function. The MFP 101 and the non-contact IC card 102 can be wirelessly connected with each other to perform communication, through a short-distance wireless communication 103.

In the present exemplary embodiment, an example where near field communication (NFC) which is an international standard of short-distance wireless communication is used as a specific communication means of the short-distance wireless communication 103 will be described. The communication range of the NFC is set at less than 10 centimeters. Therefore, by the user moving an antenna 402 of the non-contact IC card 102 closer to a communication unit 206 of the MFP 101 within a distance of less than 10 centimeters, the short-distance wireless communication 103 can be established between the MFP 101 and the non-contact IC card 102. Further, by the user keeping the antenna 402 of the non-contact IC card 102 away from the communication range of the communication unit 206 of the MFP 101, the short-distance wireless communication 103 between the MFP 101 and the non-contact IC card 102 can be disconnected. In this way, only by the user holding and moving the non-contact IC card 102 closer to or away from the MFP 101, establishment or disconnection of the short-distance wireless communication 103 between the MFP 101 and the non-contact IC card 102 can be performed.

Figure 2:
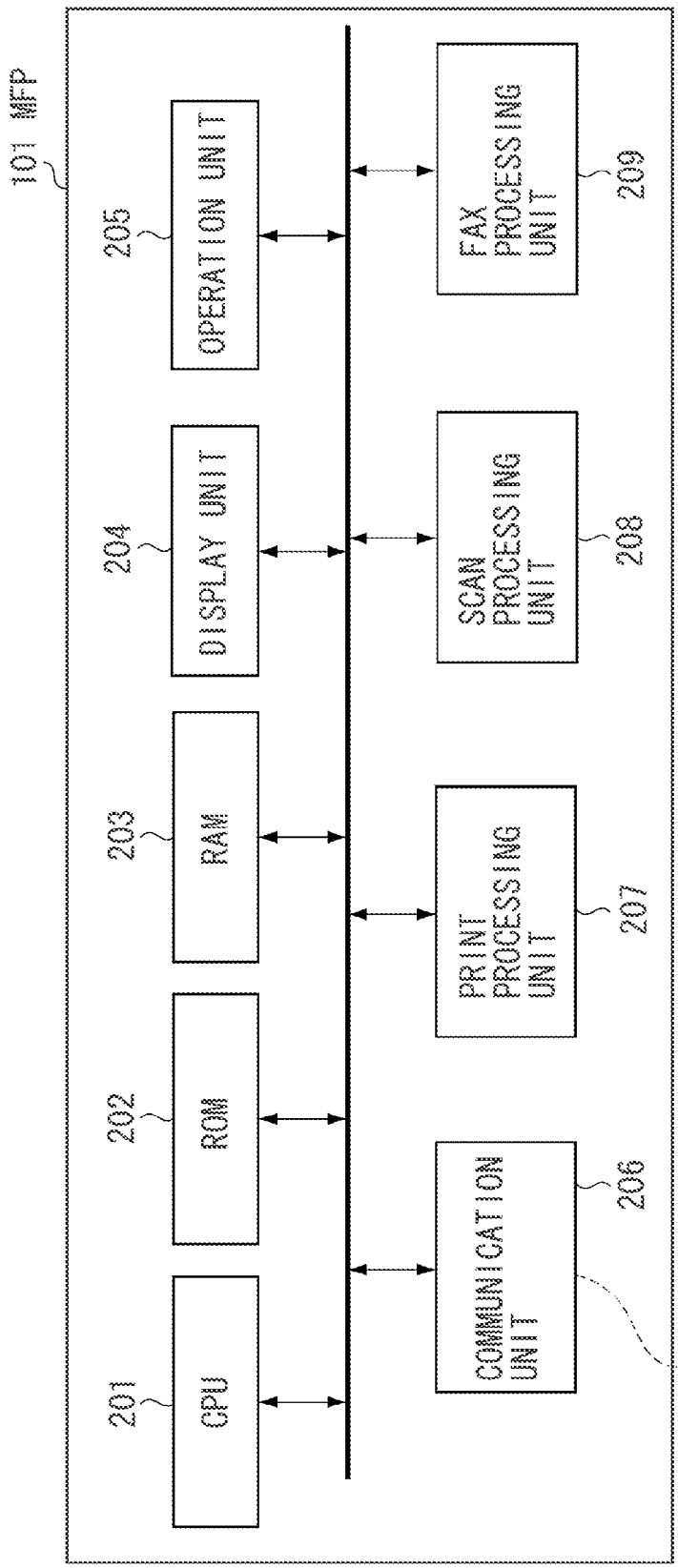
FIG. 2 is a block diagram schematically illustrating a configuration of an MFP.

Next, the outline of hardware configuration of the MFP 101 is illustrated in FIG. 2. In FIG. 2, a central processing unit (CPU) 201 controls the entire MFP 101. A ROM 202 is a nonvolatile storage area that stores therein programs or fixed data for realizing the flowcharts described below. A random access memory (RAM) 203 is a volatile storage area that temporarily stores programs or image data loaded for causing the CPU 201 to execute processing, and setting information. A display unit 204 includes a display screen such as a liquid crystal display (LCD), and performs display of images or text data according to processing content of the MFP 101. An operation unit 205 receives an input from the user to the MFP 101 via button operation or a touch panel or the like. A communication unit 206 includes an NFC chip (IC chip compatible with NFC communication standard), and realizes the short-distance wireless communication 103 with the non-contact IC card 102. The communication unit 206 transmits a message to the non-contact IC card 102, by applying modulation by generating weak radio waves.

Further, the communication unit 206 detects a load fluctuation of an IC chip 403 to receive data. A print processing unit 207 includes, for example, a printer device of an ink jet method or laser method, and performs processing such as printer device control and printing of an image onto a recording medium like paper. A scan processing unit 208 includes a scanner device, and performs processing such as scanner device control, document reading, generation of image data, and transfer it to the RAM 203. A fax processing unit 209 includes a fax device, and performs processing such as fax device control, and transmission/reception of image data to/from other information processing apparatuses.

Figure 3:
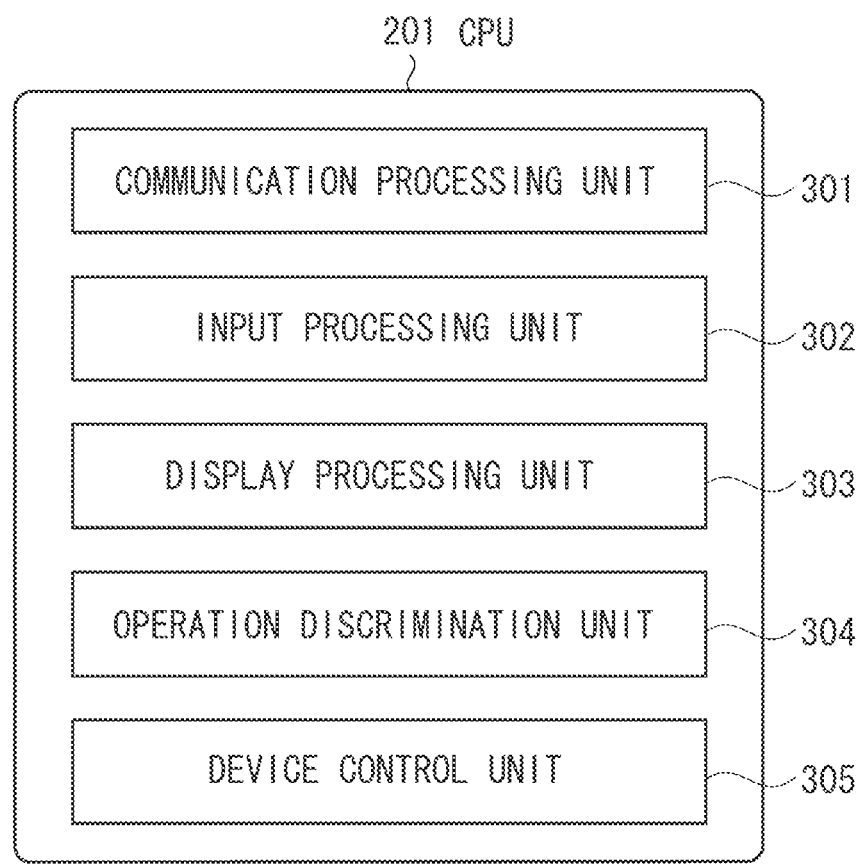
FIG. 3 is a block diagram schematically illustrating a software configuration of a central processing unit (CPU).

Next, the software configuration of the CPU 201 for realizing the flowchart described below is illustrated in FIG. 3. In FIG. 3, a communication processing unit 301 generates a message according to a processing content, and transmits the generated message to the non-contact IC card 102 via the communication unit 206. Further, the communication processing unit 301 receives and processes data via the communication unit 206 from the non-contact IC card 102. An input processing unit 302 processes input information received by the operation unit 205. A display processing unit 303 performs processing such as outputting an image to the display screen of the display unit 204. An operation discrimination unit 304 determines an operation of the MFP 101, based on the display screen of the display unit 204. A device control unit 305 performs control of the print processing unit 207, the scan processing unit 208, and the fax processing unit 209.

Figure 4:
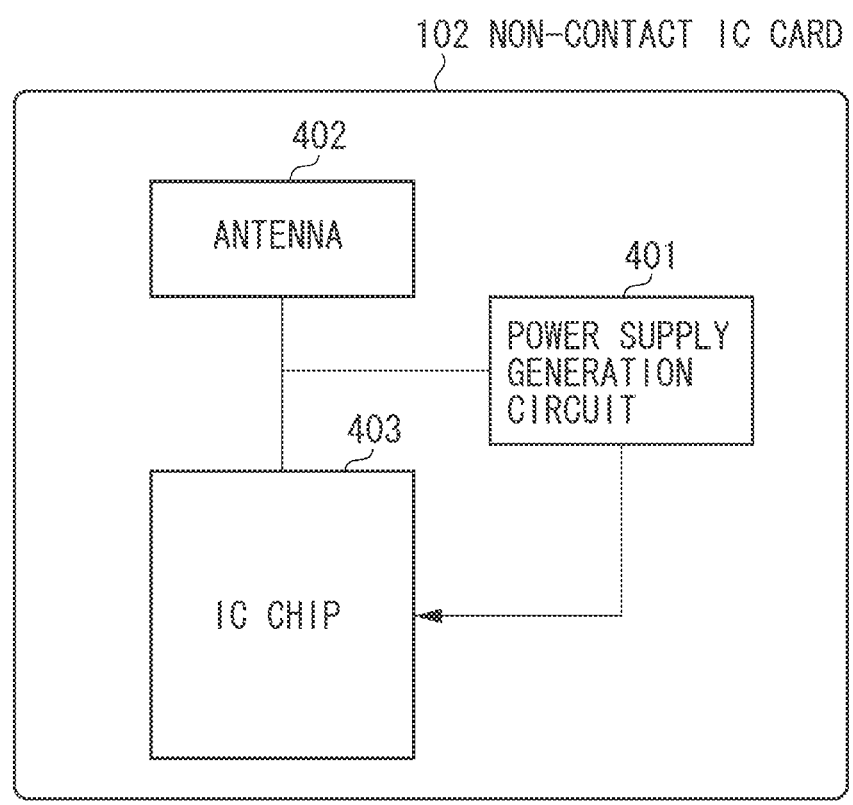
FIG. 4 is a block diagram schematically illustrating a configuration of a non-contact IC card.

Next, the hardware configuration of the non-contact IC card 102 is illustrated in FIG. 4. In FIG. 4, a power supply generation circuit 401 acquires electric power through an electromagnetic induction from weak radio waves generated by the communication unit 206, via an antenna 402. At a point when the acquired electric power exceeds a specified value, the IC chip 403 is activated. The IC chip 403 receives and processes a message from the MFP 101, via the antenna 402. Further, the IC chip 403 transmits data to the MFP 101, via the antenna 402, by switching among loads. Further, the IC chip 403 includes a nonvolatile storage area, and performs processing such as writing/reading the data into/from the nonvolatile storage area according to the received message.

Figure 5:
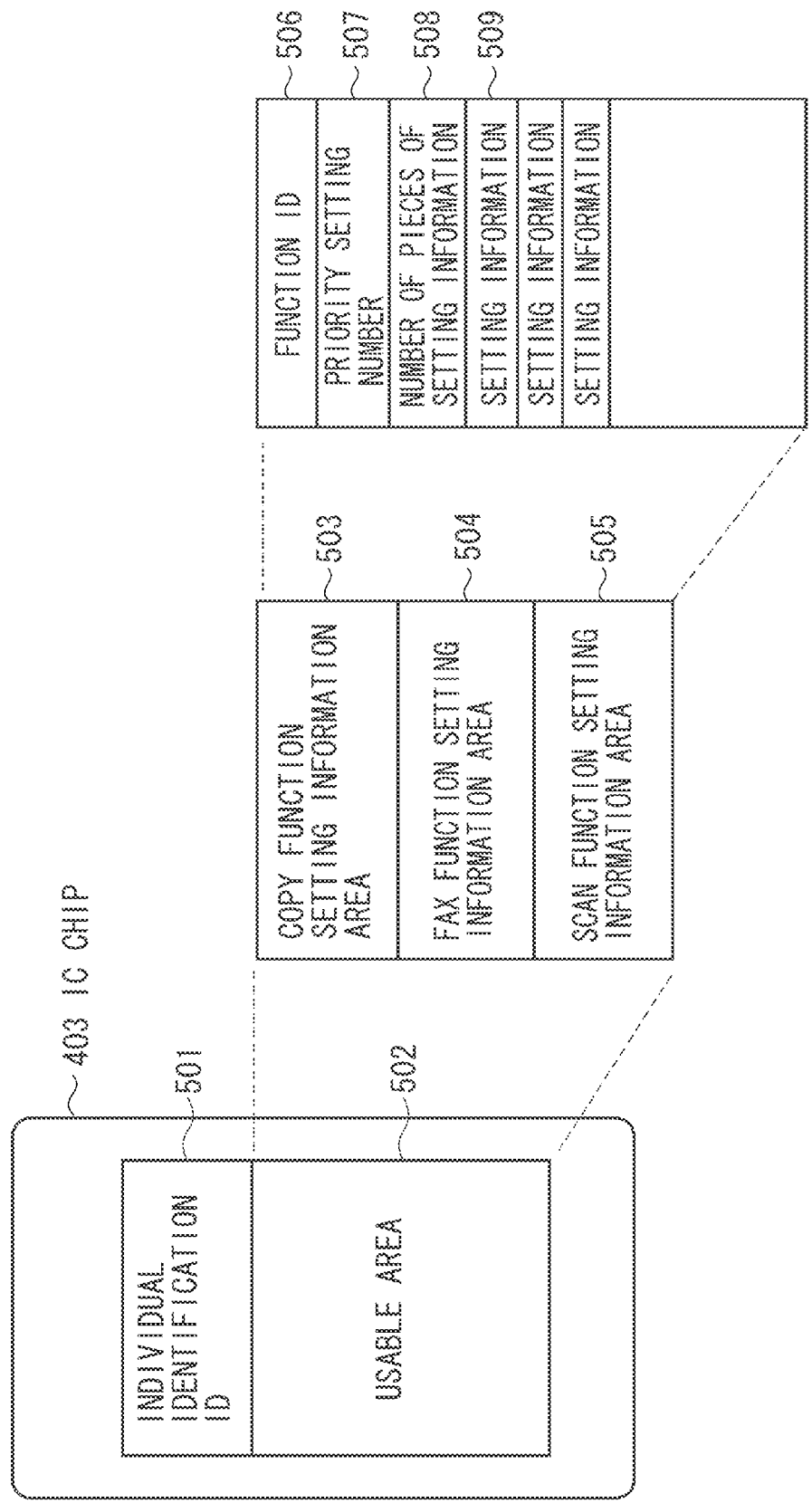
FIG. 5 is a memory map illustrating a storage content of an IC chip.

Next, the memory map of the nonvolatile storage area provided on the IC chip 403 is illustrated in FIG. 5. The nonvolatile storage area provided on the IC chip 403 includes an individual identification number 501 and a usable area 502. The individual identification number 501 is an ID for identifying each individual of card. The individual identification number 501 is assigned a non-overlapping value for each card at the factory shipment, which cannot be rewritten. The usable area 502 is a nonvolatile storage area where processing such as writing or reading of data according to a message from other information processing apparatus equipped with wireless communication function can be performed. In the present exemplary embodiment, the usable area 502 includes a copy function setting information area 503, a fax function setting information area 504, and a scan function setting information area 505. The copy function setting information area 503 includes a function ID 506, a priority setting number 507, a number of pieces of setting information 508, and one or more pieces of setting information 509. The function ID 506 is stored at the head of each of the function setting information areas (503, 504, 505), and takes a non-overlapping value for each function. In this case, the functions refer to types of services such as copy, scan, and fax which the MFP 101 provides to the user. For example, the MFP 101 acquires the function ID 506 at the head of each of the setting information areas (503, 504, 505) of respective functions, and the copy function setting information area 503 is identified by comparing the function ID 506 and the value corresponding to the copy function to determine whether they are the same or not. The priority setting number 507 is a registration number of the setting information which is regarded as a priority setting among pieces of the setting information 509.

The priority setting refers to setting information which is used most preferentially in the MFP 101 among pieces of the setting information 509 of the same function. A number of pieces of setting information 508 is a number of pieces of the setting information 509 of the same function stored by the non-contact IC card 102. The setting information 509 includes a registration number and setting details for realizing the copy function. The registration number is a number for uniquely determining the setting information 509 of the same function. The registration number has a non-overlapping value for each piece of setting information of the same function stored by the non-contact IC card 102. Further, the setting details fully contain information for realizing the copy function, such as copied in color or in monochrome, output onto which sheet size of medium, a magnification, and a number of copies. The setting details have different information from each other with respect to each function. For example, setting details of the fax function fully contain information for realizing the fax function such as an address number, a resolution, a number of times of redials, presence or absence of transmission source record. In a similar manner, setting details of the scan function fully contain information for realizing the scan function such as scanned in color or in monochrome, an extension, and a resolution.

The fax function setting information area 504 and the scan function setting information area 505 each have a memory map similar to that of the copy function setting information area 503, and therefore redundant description thereof will be avoided.

Figure 6:
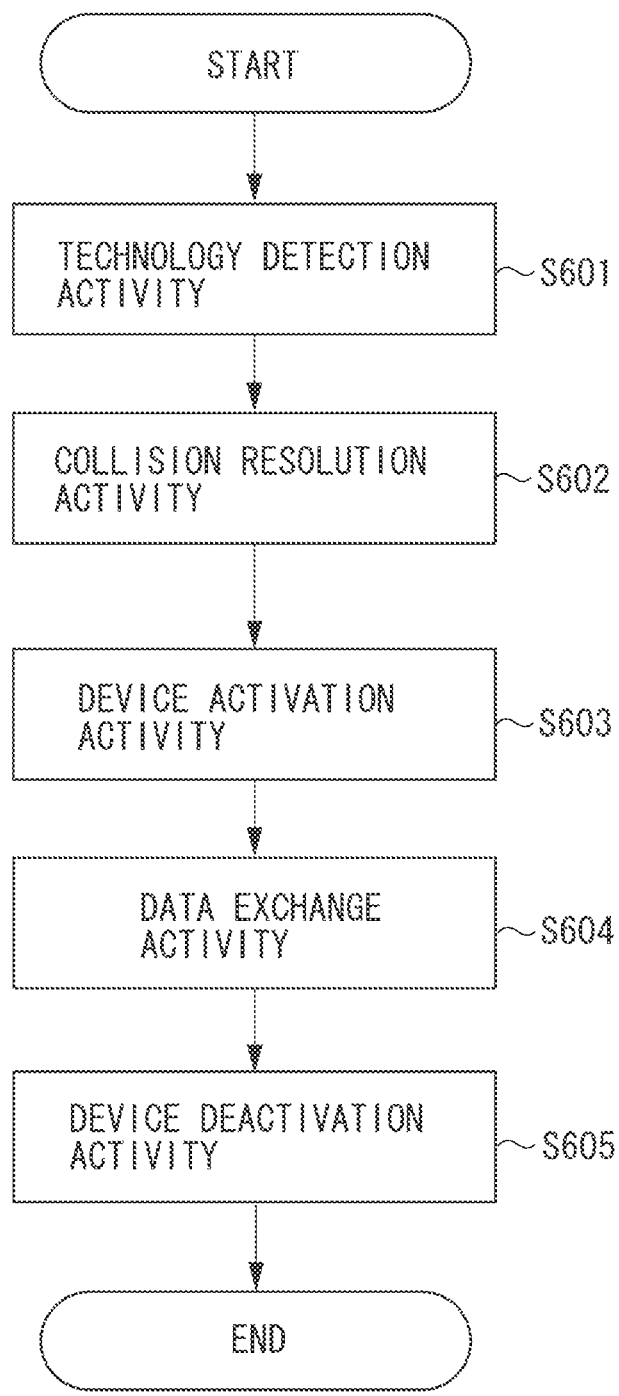
FIG. 6 is a flowchart schematically illustrating processing of the MFP.

FIG. 6 is the processing flowchart of activities of an NFC used for the short-distance wireless communication 103 between the MFP 101 and the non-contact IC card 102. In communication processing of the NFC, an NFC device realizes detection of a communication partner, communication establishment, transmission and reception of data, by performing a series of processing called activity. The NFC device is a device provided with an NFC chip.

In respective activities, a plurality of NFC devices performs establishment of communication, data exchange, and termination processing, by mutually transmitting and receiving a command. The shift of activities will be described below. First, in a technology detection activity in step S601, whether another NFC device is present within the communication range is detected, and if an NFC device is found, an NFC type of the counterpart device is confirmed by transmission and reception of a command. In a collision resolution activity in step S602, identification is performed whether a plurality of NFC devices is detected. In a device activation activity in step S603, it is determined that to which mode of a peer-to-peer (P2P) mode or a card emulator (CE) mode, for example, the detected counterpart device conforms (or is related), or a type of an NFC card. The NFC card is an IC card that can be read and written by an NFC tag reader/writer. The P2P mode is a mode that enables bidirectional transmission and reception of arbitrary data, when both NFC devices that perform communication operate in the P2P mode. The NFC devices can shift to a CE mode for enabling access from the NFC card reader/writer behaving like the NFC cards, and a reader/writer (R/W) mode for performing the read or write operation of the NFC cards, in addition to the P2P mode. In the present exemplary embodiment, the CPU 201 operates in the R/W mode, and controls communication between the communication unit 206 and the antenna 402. In the data exchange activity in step S604, the CPU 201 performs transmission/reception of data to/from the detected counterpart device. In this activity, transmission/reception of arbitrary data to/from the counterpart device is possible. In device deactivation activity in step S605, the CPU 201 performs termination processing of communication. A communication mode for actively transmitting a command through a series of the processing in steps S601 through S605 is specified by the NFC standard as a polling mode. In the present exemplary embodiment, a case where the MFP 101 is connected in the polling mode will be described. The MFP 101 performs communication connection establishment and transmission/reception of data, in response to proximity of the NFC chip provided on the communication unit 206 of the MFP 101 and the antenna 402 of the non-contact IC card 102, through a series of activity processing described above.

In the present exemplary embodiment, an example in which the MFP 101 performs execution of the copy function based on the display screen of the display unit 204 and the priority setting, in response to proximity with the non-contact IC card 102 will be described.

Figure 7:
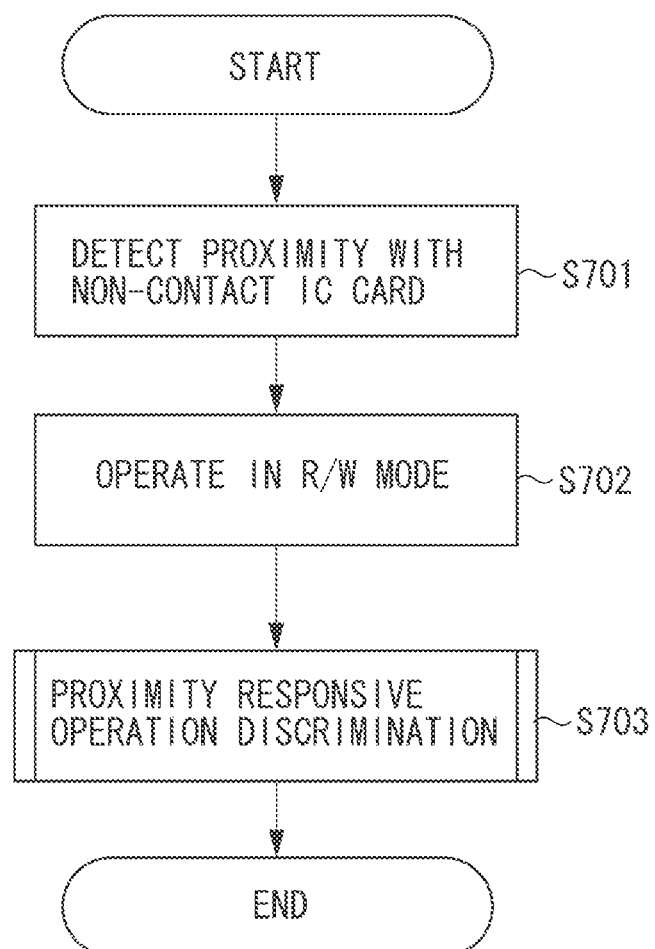
FIG. 7 is a flowchart schematically illustrating processing of the MFP.

The flowchart in the MFP 101 according to the present exemplary embodiment is illustrated in FIG. 7. First in step S701, the communication processing unit 301 detects proximity between the communication unit 206 and the antenna 402, through the processing in steps S601, S602, and S603 illustrated in FIG. 6 described above, and starts establishment processing of the short-distance wireless communication connection through the NFC communication. In step S702, the communication processing unit 301 operates in the R/W mode with respect to the non-contact IC card 102 via the communication unit 206 and performs connection thereto. In step S703, the CPU 201 performs proximity responsive operation discrimination. The transmission/reception processing in the proximity responsive operation discrimination corresponds to the data exchange activity in step S604.

Next, the flowchart illustrating procedure for the proximity responsive operation discrimination in the MFP 101 is illustrated in FIG. 8. First in step S801, the operation discrimination unit 304 determines whether the display screen of the display unit 204 is a discrimination target screen. Each display screen is assigned a screen ID. A table of screen IDs corresponding to display screens, proximity responsive operation IDs, and function IDs is illustrated in FIG. 9A. The proximity responsive operation ID and function ID will be described below. The tables illustrated in FIGS. 9A, 9B, and 9C are held in the ROM 202 of the MFP 101. The screen ID is a screen identifier allotted for each display screen of the display unit 204, as in FIG. 9A. The display screens include, for example, "copy/priority setting execution screen" and "copy/setting information operation screen". The "copy/priority setting execution screen" is a screen that receives proximity for the MFP 101 to acquire priority settings from the non-contact IC card 102, and to execute the copy function based on the priority setting. Further, the "copy/setting information operation screen" is a screen that receives proximity for the user to perform operation of correcting the setting information of the copy function stored by the non-contact IC card 102, via the operation unit 205. The discrimination target screen is a display screen for discriminating an operation of the MFP 101 when detecting a proximity of the non-contact IC card 102 (hereinafter, referred to as a proximity responsive operation), out of a plurality of display screens. Kinds of proximity responsive operations include priority setting execution and setting information operation. The priority setting execution is an operation in which the MFP 101 acquires priority settings from the non-contact IC card 102, and executes respective functions based on the priority settings. Further, the setting information operation is an operation in which the MFP 101 acquires setting information of respective functions from the non-contact IC card 102, and operates the setting information.

The operation discrimination unit 304 determines whether the display screen is a discrimination target screen, by acquiring proximity responsive operation IDs from the screen IDs, using the table illustrated in FIG. 9A. Each proximity responsive operation is assigned a proximity responsive operation ID. The table of the proximity responsive operation IDs corresponding to the proximity responsive operations is illustrated in FIG. 9B. The proximity responsive operation ID is an operation identifier allotted for each proximity responsive operation, as illustrated in FIG. 9B. Further, as illustrated in FIG. 9A, the proximity responsive operation ID is set for each display screen. In the present exemplary embodiment, it is assumed that the display screen of the display unit 204 displays the "copy/priority setting execution screen". The operation discrimination unit 304 acquires a proximity responsive operation ID from the screen ID, using the table illustrated in FIG. 9A. The operation discrimination unit 304 determines that the display screen is a discrimination target screen, by comparing the table illustrated in FIG. 9B and the proximity responsive operation ID, and the operation proceeds to step S802. In step S802, the operation discrimination unit 304 determines whether the display screen is a priority setting execution screen. In a similar manner to that in step S801, the operation discrimination unit 304 acquires a proximity responsive operation ID from the screen IDs, using the table illustrated in FIG. 9A. The operation discrimination unit 304 determines that the display screen is a priority setting execution screen (YES in step S802) by comparing the table illustrated in FIG. 9B and the proximity responsive operation ID, then the operation proceeds to step S803. In step S803, the CPU 201 performs priority setting execution.

Figure 10:
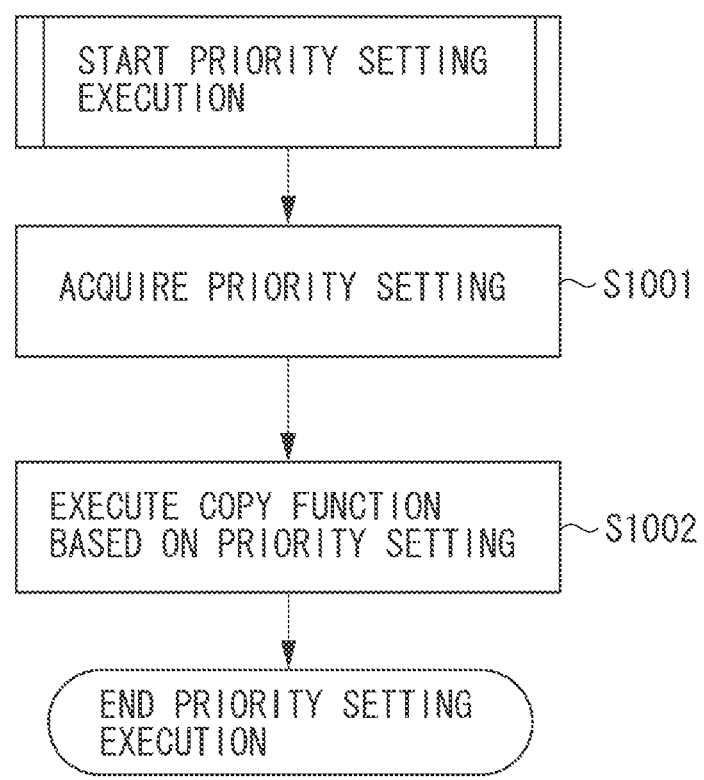
FIG. 10 is a flowchart schematically illustrating processing of the MFP.

FIG. 10 is a flowchart illustrating the procedure for executing the priority setting in the MFP 101. In step S1001, the communication processing unit 301 acquires a priority setting from the non-contact IC card 102. First, the operation discrimination unit 304 acquires a function ID from the screen ID, using the table illustrated in FIG. 9A, with respect to a function corresponding to the display screen. Each function is assigned a function ID. The table of function IDs corresponding to functions is illustrated in FIG. 9C. The function ID is a function identifier allotted for each function, as illustrated in FIG. 9C. Further, the function ID is set for each display screen, as illustrated in FIG. 9A. The operation discrimination unit 304 identifies that the function corresponding to the display screen is a copy function, by comparing the table illustrated in FIG. 9C and the function ID.

Thereafter, the communication processing unit 301 acquires function IDs 506 located at the heads of respective function setting information areas (503, 504, and 505), from the nonvolatile storage area held by the IC chip 403. The communication processing unit 301 identifies the copy function setting information area 503, by comparing the table illustrated in FIG. 9C and the acquired function IDs. Next, the communication processing unit 301 acquires the priority setting number 507 of the copy function setting information area 503. Thereafter, the communication processing unit 301 acquires registration numbers of the setting information 509 in order, and identifies and acquires setting information which is the priority setting, by comparing the acquired priority setting number 507 and the registration numbers of the setting information 509. In step S1002, the device control unit 305 executes copy function based on the priority setting. First, the device control unit 305 reads out a document placed on the MFP 101, via the scan processing unit 208, based on the priority setting received by the communication processing unit 301. Next, the device control unit 305 executes printing onto a paper sheet or the like, via the print processing unit 207.

Through the above operations, the MFP 101 performs execution of the copy function based on the display screen of the display unit 204 and the priority setting, in response to the proximity of the non-contact IC card 102.

According to the above-described exemplary embodiment, the user can start the function, by switching between screens by using the operation unit 205, and bringing the non-contact IC card 102 into proximity. As a result, a number of times of input operations using the operation unit 205 can be reduced, and enhanced operability of the MFP 101 can be expected.

In the first exemplary embodiment, an example where the MFP 101 performs execution of the copy function based on the display screen of the display unit 204 and the priority setting, in response to the proximity of the non-contact IC card 102 has been described. On the other hand, in a second exemplary embodiment, an example where the MFP 101 performs, in response to the similar proximity, setting information operation of the copy function based on the display screen of the display unit 204 will be described. The configurations or steps having the same functions as those in the first exemplary embodiment are assigned the same reference numerals, and regarding unchanged components in configuration or function, redundant description thereof will be avoided.

The device configurations illustrated FIGS. 1, 2, 3, and 4, the memory map illustrated in FIG. 5, and the flowcharts illustrated in FIGS. 6, 7, and 8 are similar to those in the first exemplary embodiment. Further, in the present exemplary embodiment, it is assumed that the display screen of the display unit 204 displays the "copy/setting information operation screen". In FIG. 8, the operation of the MFP 101 in step S801 is similar to that in the first exemplary embodiment, and therefore redundant description thereof will be avoided. In step S802, the operation discrimination unit 304 determines whether the display screen is a priority setting execution screen. First, the operation discrimination unit 304 acquires a proximity responsive operation ID from the screen ID, by using the table illustrated in FIG. 9A. Furthermore, the operation discrimination unit 304 compares the table illustrated in FIG. 9B and the proximity responsive operation ID, and identifies that the display screen is a setting information operation screen (NO in step S802), then the operation proceeds to step S804. In step S804, the CPU 201 performs setting information operation.

Figure 11:
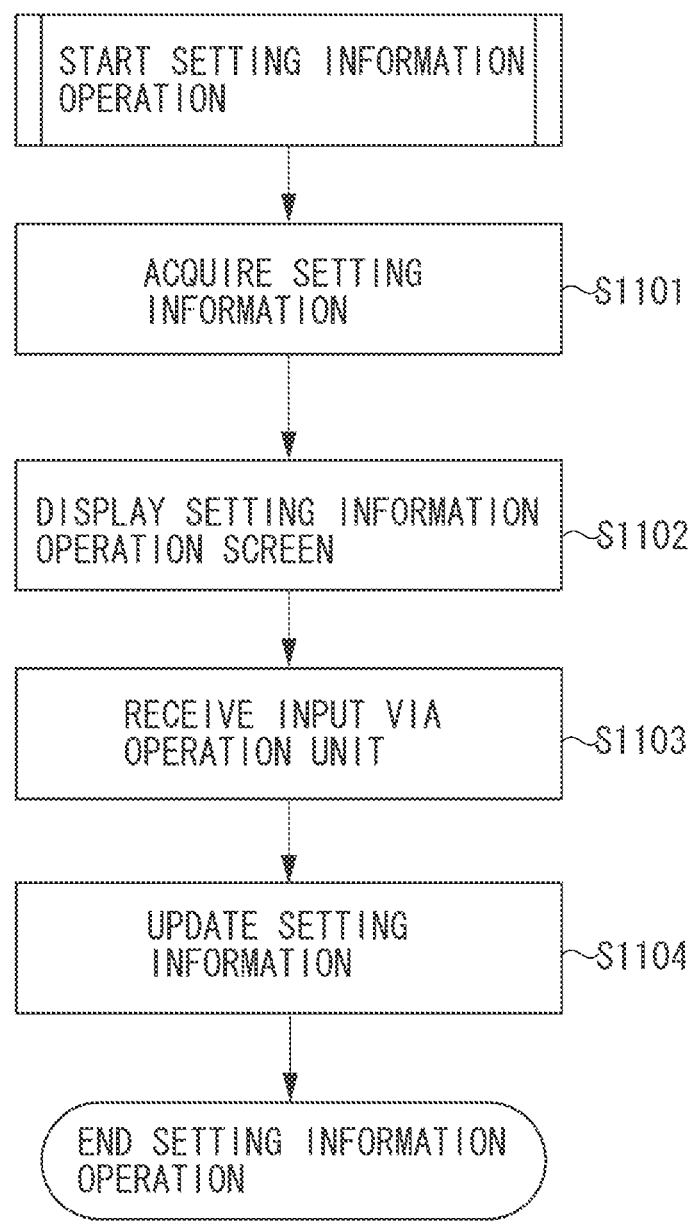
FIG. 11 is a flowchart schematically illustrating processing of the MFP.
Figure 12A:
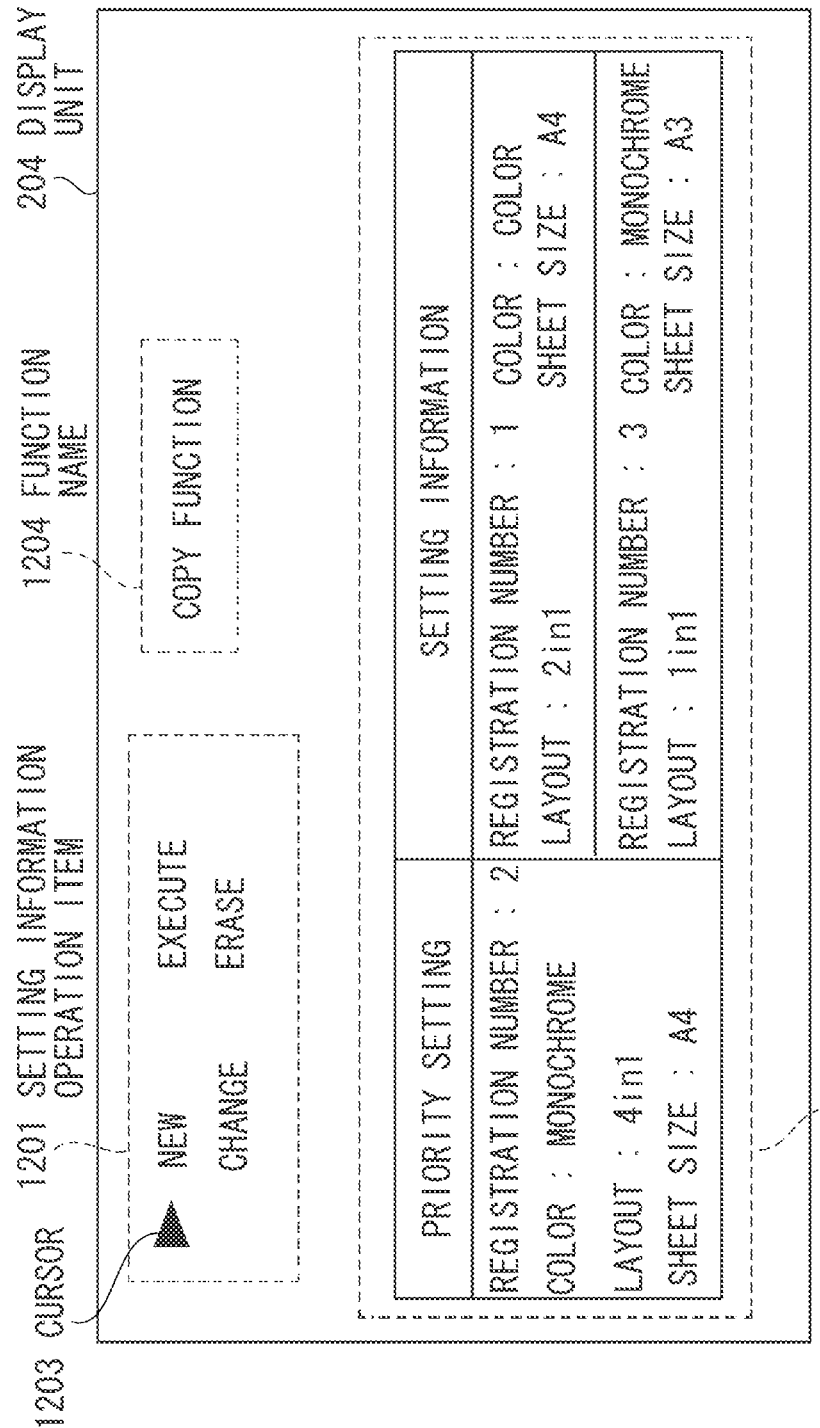

FIG. 11 is a flowchart illustrating a procedure for setting information operation in the MFP 101. In step S1101, the communication processing unit 301 acquires setting information of the copy function from the non-contact IC card 102. First, the operation discrimination unit 304 acquires a function ID from the screen ID, by using the table illustrated in FIG. 9A. Furthermore, the operation discrimination unit 304 identifies that the function corresponding to the display screen is a copy function, by comparing the table illustrated in FIG. 9C and the function ID. Thereafter, the communication processing unit 301 acquires the function IDs 506 at the heads of respective function setting information areas (503, 504, and 505), from the nonvolatile storage area held by the IC chip 403. The communication processing unit 301 compares the table illustrated in FIG. 9C and the acquired function IDs, and identifies the copy function setting information area 503. Next, the communication processing unit 301 acquires the priority setting number 507 and the number of pieces of setting information 508 of the copy function setting information area 503. Thereafter, the communication processing unit 301 acquires pieces of the setting information 509 in order equivalent to the number of pieces of setting information 508. In step S1102, the display processing unit 303 generates an operation screen containing the details of the setting information, and displays it on the display screen of the display unit 204, based on the setting information and the priority setting number of the copy function acquired by the communication processing unit 301 from the non-contact IC card 102. An example of the display unit 204 displaying the operation screen is illustrated in FIG. 12A. A setting information operation item 1201 is an item for operating the setting information 509, by using the operation unit 205. The setting information operation item 1201 includes, for example, "New", "Change", "Erase", and "Execute". "New" is an item for newly adding setting information to the non-contact IC card 102. "Change" is an item for the MFP 101 to perform changing of a content of the setting information held by the non-contact IC card 102. "Erase" is an item for the MFP 101 to erase the setting information held by the non-contact IC card 102. "Execute" is an item for the MFP 101 to execute the function based on the setting information selected via the operation unit 205, from among the setting information held by the non-contact IC card 102. A setting information detail 1202 indicates the details of the setting information 509 of the copy function that the MFP 101 has acquired from the non-contact IC card 102, in step S1101. A function name 1204 indicates which function of the setting information displayed by the display unit 204. In step S1103, the input processing unit 302 receives an input, via the operation unit 205. According to the received input, the input processing unit 302 performs operation of the setting information acquired by the communication processing unit 301. Accordingly, by the user operating a cursor 1203 by using the operation unit 205, setting information operation of the copy function held by the non-contact IC card 102 becomes possible.

As an example, a procedure for newly adding setting information of the copy function will be described. First, the user operates the cursor 1203 by using the operation unit 205, and selects "New" of the setting information operation item 1201. An example of the display unit 204 when "New" has been selected is illustrated in FIG. 12B. Setting items 1205 represent items that the user can change, in executing the copy function. Respective setting items have been previously described in the description of the setting information 509 and therefore redundant description thereof will be avoided. Setting contents 1206 represent contents set for respective setting items. The setting items 1205 for which contents have not yet been set become "Not-yet-set". Next, the user selects "color mode" by using the operation unit 205. An example of the display unit 204 when the "color mode" is selected is illustrated in FIG. 12C. Color mode items 1207 represent items that the user can select in the "color mode" of the setting items 1205. The user selects "color" to perform printing in color, and "monochrome" when to perform printing in monochrome, by using the operation unit 205. Other setting items 1205 are similarly set. After setting, step S1103 for reception of the operation unit input is completed by selecting "Completed", by using the operation unit 205. Through the above procedure, setting information of the copy function can be newly added.

In step S1104, the communication processing unit 301 updates, via the communication unit 206, setting information of the copy function, a number of pieces of the setting information, and a priority setting number held by the non-contact IC card 102. First, the communication processing unit 301 acquires the function IDs 506 located at the heads of respective function setting information areas (503, 504, and 505), from the nonvolatile storage area held by the IC chip 403. The communication processing unit 301 identifies the copy function setting information area 503, by using the table illustrated in FIG. 9C and the acquired function IDs 506. Next, the communication processing unit 301 transmits the priority setting number 507, the number of pieces of setting information 508, and the setting information 509, via the IC chip 403, and writes them into the copy function setting information area 503.

Through the above operations, the MFP 101 performs setting information operation of the copy function, based on the display screen of the display unit 204, in response to the proximity with the non-contact IC card 102.

Accordingly, the user can perform setting information operation of the copy function held by the non-contact IC card 102, by operating the cursor 1203, by using the operation unit 205. As a result, when causing the functions of the MFP 101 to be executed, the user will no longer need to perform inputs using the operation unit 205 every time, and thus enhanced operability of the MFP 101 can be expected.

In the first and second exemplary embodiments, an example where the MFP 101 performs the proximity responsive operation, based on the display screen of the display unit 204, in response to the proximity with the non-contact IC card 102 has been described. On the other hand, in a third exemplary embodiment, an example where the MFP 101 performs execution of the copy function based on the priority setting, depending on whether the non-contact IC card 102 is moved away therefrom before the time "t" has elapsed from the start of timer after the proximity of the non-contact IC card 102 will be described. The configurations or steps having the same functions as those in the first and second exemplary embodiments are assigned the same reference numerals, and regarding unchanged components in configuration or function, redundant description thereof will be avoided. The device configurations illustrated in FIGS. 1, 2, 3, and 4, the memory map illustrated in FIG. 5, and the flowcharts illustrated in FIGS. 6, 7, and 11 are similar to those in the first and second exemplary embodiments. The operation discrimination unit 304, in FIG. 3 of the present exemplary embodiment, has a timer, and the communication processing unit 301 determines whether the non-contact IC card 102 is in a proximity state, after the time "t" has elapsed from the start of the timer. Further, the MFP 101 holds the table of the function IDs illustrated in FIG. 9C, in the ROM 202. The operation discrimination unit 304 holds the function ID corresponding to the selected function. In the present exemplary embodiment, it is assumed that the operation discrimination unit 304 holds the function ID corresponding to the copy function. In the present exemplary embodiment, it is assumed that the user moves away the non-contact IC card 102 from the communication unit 206 before the time "t" has elapsed from the start of the timer, to disconnect the short-distance wireless communication 103.

In FIG. 7, the operations of the MFP 101 up to step S703 are similar to those in the first and second exemplary embodiments, and therefore redundant description thereof will be avoided.

Figure 13:
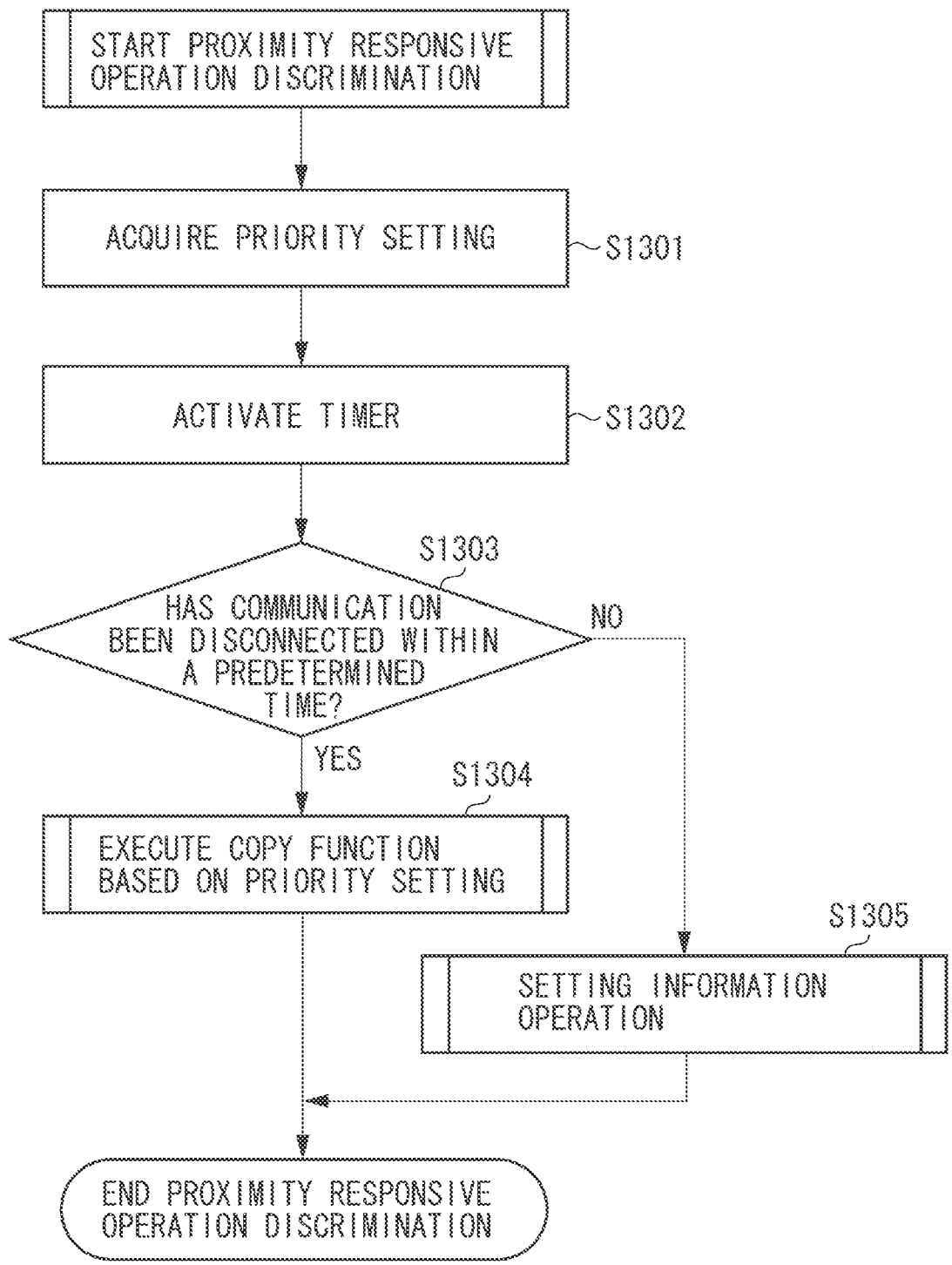
FIG. 13 is a flowchart schematically illustrating processing of the MFP.

FIG. 13 is a flowchart illustrating a procedure for a proximity responsive operation discrimination in the MFP 101. In step S1301, the communication processing unit 301 acquires a priority setting from the non-contact IC card 102. First, the operation discrimination unit 304 acquires a function ID, by using the table illustrated in FIG. 9C. The operation discrimination unit 304 identifies that the selected function is the copy function, by comparing the table illustrated in FIG. 9C and the function ID. The subsequent processing for the MFP 101 to acquire the priority setting of the copy function from the non-contact IC card 102 is similar to that in the first exemplary embodiment, and therefore redundant description thereof will be avoided. In step S1302, the operation discrimination unit 304 starts the timer. In step S1303, after the time "t" has elapsed from the start of the timer, the communication processing unit 301 determines whether the short-distance wireless communication 103 of the non-contact IC card 102 is in a connected state. The time "t" is a threshold value for the operation discrimination unit 304 to determine proximity responsive operation. The time "t" assumes about one second. The communication processing unit 301 determines that the non-contact IC card 102 is brought into proximity to the communication unit 206, and is moved away therefrom before time "t" has elapsed from the start of the timer (YES in step S1303), then the operation proceeds to step S1304. In step S1304, the device control unit 305 executes the copy function based on the priority setting. In step S1304, the processing similar to that in step S1002 described above is performed, and therefore redundant description thereof will be avoided.

As described above, in response to the proximity with the non-contact IC card 102, the MFP 101 performs execution of the copy function based on the priority setting, depending on whether the non-contact IC card 102 is moved away therefrom before the time "t" has elapsed from the start of the timer after the proximity.

According to the above-described exemplary embodiment, the user can start the function by switching between the functions using the operation unit 205, and bringing the non-contact IC card 102 into proximity. As a result, the number of times of input operations using the operation unit 205 can be reduced, and thus enhanced operability of the MFP 101 can be expected.

In the third exemplary embodiment, in response to proximity between the MFP 101 and the non-contact IC card 102, depending on whether the non-contact IC card 102 is moved away therefrom before the time "t" has elapsed from the start of the timer after the proximity, an example of performing execution of the copy function based on the priority setting has been described. On the other hand, in a fourth exemplary embodiment, in response to the proximity between the MFP 101 and the non-contact IC card 102, an example will be described in which setting information operation of the copy function is performed, based on whether the non-contact IC card 102 is moved away therefrom before the time "t" has elapsed from the start of the timer after the proximity. The Configurations or steps having the same functions as those in the third exemplary embodiment are assigned the same reference numerals, and regarding unchanged components in configuration or function, redundant description thereof will be avoided.

The flowchart illustrated in FIG. 11 is similar to that in the second exemplary embodiment. Further, the device configurations illustrated in FIGS. 1, 2, 3, and 4, the memory map illustrated in FIG. 5, and the flowcharts illustrated in FIGS. 6, 7, and 13 are similar to those in the third exemplary embodiment. The configurations or steps having the same functions as those of the second and third exemplary embodiments are assigned the same reference numerals, and regarding unchanged components in configuration, or function, redundant description thereof will be avoided. In the present exemplary embodiment, similar to the third exemplary embodiment, it is assumed that the operation discrimination unit 304 holds the function IDs corresponding to the copy functions. In the present exemplary embodiment, it is assumed that the user keeps the short-distance wireless communication 103, while the non-contact IC card 102 is kept to be brought into proximity to the communication unit 206, even after the time "t" has elapsed from the start of the timer.

In FIG. 13, the operations of the MFP 101 up to step S1302 are similar to those in the third exemplary embodiment, and therefore redundant description thereof will be avoided. In step S1303, the communication processing unit 301 determines whether the short-distance wireless communication 103 of the non-contact IC card 102 is disconnected before the time "t" has elapsed from the start of the timer in step S1302, by using the timer. In this process, if the communication processing unit 301 determines that the non-contact IC card 102 is in a proximity state without being moved away therefrom, even after the time "t" has elapsed from the start of the timer (NO in step S1303), then the operation proceeds to step S1305. In step S1305, the CPU 201 performs setting information operation. The setting information operation is as illustrated in FIG. 11 described above and therefore redundant description thereof will be avoided.

Through the above operations, in response to the proximity with the non-contact IC card 102, the MFP 101 performs the setting information operation of the copy function, based on whether the non-contact IC card 102 is moved away therefrom immediately after the proximity.

In the respective exemplary embodiments described above, an example where NFC is used as the short-distance wireless communication 103 has been described, but the present any communication protocol enabling short-distance wireless communication is applicable. As a matter of course, if the used communication standards are different, effective communication ranges are different, but even if effective communication ranges are different, the present invention can be applied similarly. Further, in the respective exemplary embodiments described above, the non-contact IC card 102 has been taken as a wireless communication apparatus. On the other hand, mobile terminals such as smart phones may be used as wireless communication apparatuses. In that case, the MFP 101 determines that a device that has detected proximity, in the device activation activity, operates in the P2P mode. At this time, even when the MFP 101 operates in the P2P mode, the above-described embodiments can be applied similarly. In the first and third exemplary embodiments, an example where the MFP 101 executes the function based on the priority setting acquired by the MFP 101 from the non-contact IC card 102, has been taken.

On the other hand, among the priority settings held by the non-contact IC card 102, if there is the setting item 1205 of not-yet-set, the MFP 101 may execute the function, by setting the setting item of not-yet-set based on a setting content that the MFP 101 has received via the operation unit 205. Further, in the third and fourth exemplary embodiments, a case where the operation discrimination unit 304 determines kinds of proximity responsive operations of the MFP 101, depending on whether the time "t" has elapsed from the start of the timer has been taken as an example. On the other hand, the operation discrimination unit 304 may determine proximity kinds of the compliant operations of the MFP 101, based on the number of times of proximities.

Furthermore, kinds of three or more proximity responsive operations may be determined by adding an infrared sensor to the MFP 101, or by adding a gyro sensor to the non-contact IC card 102 side. Further, in the third and fourth exemplary embodiments described above, one second is employed for the time "t" which is a threshold value for the operation discrimination unit 304 to determine the proximity responsive operation of the MFP 101, but the time "t" may be changed by using the operation unit 205 by the user. Further, in the fourth exemplary embodiment described above, in a case where the non-contact IC card 102 is moved away from the MFP 101, before acquiring the priority setting after detecting the proximity of the non-contact IC card 102, the present function may be terminated by displaying a message that the priority setting of the display screen of the display unit 204 could not be acquired.

In the above-described exemplary embodiments, while the MFP has been described as an example, any information processing apparatus having detailed settings and equipped with a plurality of functions which would be alternatively executed, such as HDD recorders, high-function home electronics, and video devices for professionals, is applicable. For example, by configuring the setting information to include a lookup table for color conversion (LUT), and setting the LUT, the function including a color conversion for photographing or printing may be executed.

According to the above-described embodiments, the number of times of input operations for executing a function that the user desires to be executed can be reduced, and thus operability can be enhanced.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2013-053601 filed Mar. 15, 2013, which is hereby incorporated by reference herein in its entirety.

What is claimed is:

1. An information processing apparatus comprising:
a detection unit configured to detect a wireless communication apparatus;
an acquisition unit configured to acquire, from the wireless communication apparatus, setting information for executing a function of the information processing apparatus, in response to detection by the detection unit;
an execution unit configured to execute the function based on the setting information acquired by the acquisition unit;
a writing unit configured to write setting information for executing the function into a storage area of the wireless communication apparatus;
a display unit configured to display information; and
a selection unit configured to select, based on a content of information displayed by the display unit, whether the execution unit executes the function in response to detection by the detection unit, or the writing unit performs the writing in response to detection by the detection unit.

2. The information processing apparatus according to claim 1, wherein the display unit displays a screen corresponding to the function.

3. The information processing apparatus according to claim 1,
wherein the acquisition unit acquires a plurality of pieces of setting information corresponding to each of a plurality of functions, and the execution unit executes each of the plurality of functions based on a corresponding piece of setting information among the plurality of pieces of setting information.

4. The information processing apparatus according to claim 1, further comprising an operation unit configured to operate the setting information acquired by the acquisition unit.

5. The information processing apparatus according to claim 4, wherein the operation unit performs at least one operation of erasing the setting information, changing the setting information, and executing an operation based on the setting information.

6. The information processing apparatus according to claim 1, further comprising:
a discrimination unit configured to determine an operation of the wireless communication apparatus,
wherein the information processing apparatus has a plurality of functions, and the function executed by the execution unit is, among the plurality of functions, a function which is related to an operation of the wireless communication apparatus.

7. The information processing apparatus according to claim 6,
wherein the acquisition unit acquires a plurality of pieces of setting information corresponding to each of the plurality of functions, and the execution unit executes the function based on, among the plurality of pieces of setting information,
setting information according to an operation determined by the discrimination unit.

8. The information processing apparatus according to claim 1, wherein the function includes at least one of copy, scan, or facsimile.

9. The information processing apparatus according to claim 1, wherein the information processing apparatus has a plurality of functions, and the function executed by the execution unit is, among the plurality of functions, a function corresponding to the content of the information displayed by the display unit when detection by the detection unit is performed.

10. The information processing apparatus according to claim 1, wherein detection by the detection unit, acquisition by the acquisition unit, and writing by the writing unit are performed based on near field communication (NFC).

11. The information processing apparatus according to claim 1, wherein selection by the selection unit is performed based on the content of the information displayed by the display unit when detection by the detection unit is performed.

12. The information processing apparatus according to claim 1, wherein the selection unit selects executing the function by the execution unit in a case where information for executing the function is displayed by the display unit when detection by the detection unit is performed, and selects writing by the writing unit in a case where information for setting information for executing the function is displayed by the display unit when detection by the detection unit.

13. The information processing apparatus according to claim 1, wherein the function is a print function or a copy function, and wherein the selection unit selects executing the print function by the execution unit in a case where information for executing the print function is displayed by the display unit when detection by the detection unit is performed, and selects executing the copy function by the writing unit in a case where information for executing the copy function is displayed by the display unit when detection by the detection unit is performed.

14. A control method for an information processing apparatus, the control method comprising:
displaying a screen corresponding to at least one of the plurality of functions;
detecting a wireless communication apparatus;
acquiring, in response to detecting the wireless communication apparatus, from the wireless communication apparatus setting information for causing a function corresponding to the displayed screen to be executed;
executing a function corresponding to the displayed screen based on the acquired setting information;
writing setting information for executing a function into a storage area of the wireless communication apparatus; and
selecting, based on a content of information displayed, whether to execute the function or write setting information for executing a function in response to detecting a wireless communication apparatus.

15. An information processing system, the information processing system including:
an information processing apparatus; and
a wireless communication apparatus,
wherein the information processing apparatus comprises:
a display unit configured to display a screen corresponding to at least one of a plurality of functions;
a detection unit configured to detect a wireless communication apparatus;
an acquisition unit configured to acquire from the wireless communication apparatus setting information for causing a function corresponding to a screen displayed on the display unit to be executed, in response to detection by the detection unit;

an execution unit configured to execute a function corresponding to a screen displayed on the display unit, based on the setting information acquired by the acquisition unit;

a writing unit configured to write setting information for executing the function into a storage area of the wireless communication apparatus; and a selection unit configured to select, based on a content of information displayed by the display unit, whether the execution unit executes the function in response to detection by the detection unit, or the writing unit performs the writing in response to detection by the detection unit.

16. An information processing system, the information processing system including:

an information processing apparatus; and a wireless communication apparatus, wherein the information processing apparatus comprises:

a display unit;

a detection unit configured to detect a wireless communication apparatus;

a discrimination unit configured to determine an operation of the wireless communication apparatus;

an acquisition unit configured to, in response to the detection by the detection unit, acquire from the wireless communication apparatus setting information for causing a function corresponding to an operation determined by the discrimination unit to be executed; and an execution unit configured to execute a function corresponding to a screen displayed on the display unit based on the setting information acquired by the acquisition unit, an-et a writing unit configured to write setting information for executing the function into a storage area of the wireless communication apparatus; and a selection unit configured to select, based on a content of information displayed by the display unit, whether the execution unit executes the function in response to detection by the detection unit, or the writing unit performs the writing in response to detection by the detection unit.

17. An information processing apparatus comprising:

a detection unit configured to detect a wireless communication apparatus;

an acquisition unit configured to acquire, from the wireless communication apparatus, setting information for executing a function of the information processing apparatus, in response to detection by the detection unit;

an execution unit configured to execute the function based on the setting information acquired by the acquisition unit;

a display unit configured to display a screen corresponding to the function;

wherein the acquisition unit acquires a plurality of pieces of setting information corresponding to each of a plurality of functions, and the execution unit executes each of the plurality of functions based on a corresponding piece of setting information among the plurality of pieces of setting information; and a writing unit configured to write the setting information read out by the acquisition unit into a storage area of the wireless communication apparatus.

* * * * *